UNITED STATES PATENT OFFICE.

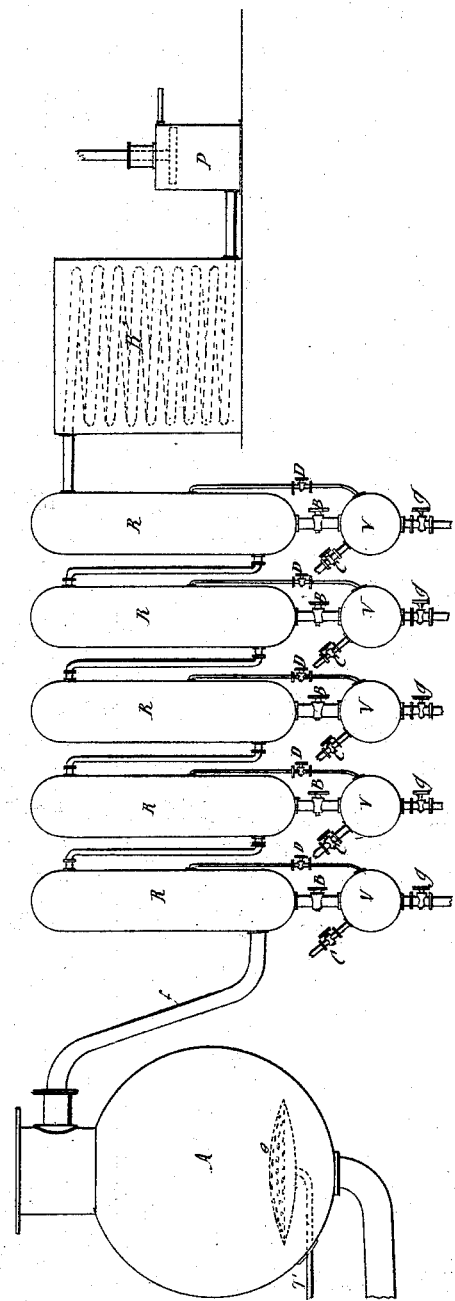

FRANÇOIS ARMANDY, OF SAINT FONS, FRANCE.

DISTILLATION OF GLYCERINE AND APPARATUS CONNECTED THEREWITH.

SPECIFICATION forming part of Letters Patent No. 262,913, dated August 22, 1882.

Application filed January 10, 1882. (No model.) Patented in France November 25, 1881, No. 146,027; in England December 7, 1881, No. 5,348; in Italy December 31, 1881, XXVII, 240, and in Belgium January 16, 1882, No. 56,787.

*To all whom it may concern:*

Be it known that I, FRANÇOIS ARMANDY, of Saint Fons, near Vemssieux, Department of the Rhône, France, have invented Improvements in the Distillation of Glycerine and in Apparatus Connected Therewith; and I do hereby declare that the following is a full, clear, and exact description of the same, and that I have received Letters Patent for the said invention in the following countries, to wit: in France, for fifteen years, by Letters Patent No. 146,027, dated November 25, 1881; in Great Britain, for fourteen years, by Letters Patent No. 5,348, dated December 7, 1881; in Italy, for fifteen years, by Letters Patent No. 240, of the Volume XXVII, dated December 31, 1881, and in Belgium by Letters Patent No. 56,787, dated January 16, 1882.

The distillation of glycerine in order to purify it by separating it from the foreign matters which it contains in its crude commercial condition is effected, according to most recent methods, in stills traversed by currents of superheated steam. These distillatory processes, however, in order to be effectual require a very high temperature and a considerable volume of steam, the product on the one hand being greater the higher the steam-pressure, while on the other hand the chemical quality of the glycerine so distilled deteriorates in proportion as the pressure of the steam is increased.

This invention relates to an improved process of and apparatus for distillation; and it consists essentially in the employment of a vacuum in the purification of glycerine on a commercial scale, whereby the expenditure of steam is reduced by one-half and the production of distilled glycerine increased fourfold, and whereby I avoid altogether or in great measure the carbonization of the glycerine (inevitable in distilling in the ordinary way, owing to the high temperature of the steam employed) and the consequent formation of tar or other residues, as well as the loss of glycerine carried off by the escaping vapors, which is often considerable.

It has been found by experiment that it is preferable to distill the glycerine at as low a temperature and in as short a space of time as possible. To this end it is proposed, according to this invention, to distill in a closed vessel, and to extract the vapors as fast as they are formed by means of a pump or other exhausting apparatus capable of maintaining in the still as perfect a vacuum as possible under such conditions. I may also distill at a high temperature by employing only a very small quantity of steam. The specific gravity of the distilled glycerine is raised to an average density of 1.265, and the operation in the still is rendered more regular and controlled with greater facility.

The invention thus consists broadly in the application in the process of distilling glycerine of a more or less perfect vacuum in apparatus which may be of any kind deemed most suitable for the purpose, but which provides for the production of a vacuum. The condensation of the distilled products is effected in condensers of any suitable kind; but instead of allowing the condensed glycerine to run off directly I collect it in a series of separate receivers. The apparatus for producing a vacuum may be a pump, steam-jet, aspirator, or a column of liquid of a height corresponding to the vacuum required, whereby the water of condensation in the refrigerator is extracted and the vacuum maintained.

The following are the advantages realized by the process of this invention:

First, the distillation is effected at a very low temperature, and there is consequently little waste by reason of the product being attached and destroyed, and consequently a small amount of residue produced.

Second, the distilling operation is more regular, and yields a larger product of better quality.

Third, the distillation is effected much more rapidly.

Fourth, the distilled product is whiter and purer.

Fifth, the product is entirely condensed, and there is consequently no appreciable loss of glycerine.

The accompanying drawing illustrates in side view one form of the apparatus which may be employed in carrying out this invention in practice.

A is the still, in which the glycerine is placed. Said still contains a rose, e, at the lower part, by which the superheated steam introduced by pipe T is distributed uniformly through the glycerine. The resulting mixture of steam and glycerine passes out through the neck f and traverses a series of condensers, R, in which the glycerine alone condenses, the steam passing on to the refrigerating-worm R', where it is condensed. The water of condensation is extracted by the pump P, and may be pumped into any suitable receiver or allowed to run away. In consequence of the vacuum thus produced in the condensers R the whole of the glycerine is condensed therein, while the steam remains in the state of vapor, even at the temperature (about 175° Fahrenheit) which reigns in the last of the series of condensers. The distillation is consequently very active, and I am enabled to obtain as much as four times the quantity of glycerine at a higher density (1.260) than by the processes now employed, the best of which usually yield an inferior product of a density barely reaching 1.160. The glycerine is entirely condensed, because the quantity of steam employed in the distillation being less, the glycerine is not carried off, and the temperature of the last condenser is much lower. The distilled and condensed glycerine may be withdrawn from the condensers every two hours, or as often as may be required, without interrupting or delaying the operation, for which purpose each condenser is connected with a separate horizontal cylinder, V, beneath, with which it can be put in communication when necessary, as hereinafter described. The cylinder V is connected with the condenser by a pipe attached to the lowest part of the latter, and furnished with a cock, B, and also by another pipe attached to the condenser at about the middle of its height and furnished with a cock, D.

C is an air-inlet cock. To draw off the distilled and condensed glycerine from the condenser the air-inlet cock C is shut and cock D opened, and the draw-off cock g being shut, a vacuum is formed in the cylinder V. The cock B is then opened and the glycerine runs into the cylinder V, and when all has been thus withdrawn the cocks B D are shut, and the air-inlet cock C being then opened, the glycerine can be drawn off at cock g.

I claim—

1. In the process of distilling commercial glycerine for the purpose of purifying it, the effecting the said operation in vacuo, substantially as herein described.

2. The combination, with a still, of the condensers R, cylinders V, pipes and cocks B C D, and pump P, substantially as herein shown and described.

FRANÇOIS ARMANDY.

Witnesses:
P. HOLLARD,
J. BOVIERT.